United States Patent [19]

Yamasaki et al.

[11] Patent Number: 5,652,870

[45] Date of Patent: Jul. 29, 1997

[54] MICROCOMPUTER HAVING MULTIPLEXABLE INPUT-OUTPUT PORT

[75] Inventors: Takashi Yamasaki; Hiroshi Sasahara; Tadahiko Komatsu, all of Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 420,168

[22] Filed: Apr. 11, 1995

[51] Int. Cl.[6] .................................................. G06F 13/16
[52] U.S. Cl. ........................................................ 395/500
[58] Field of Search ........................ 365/189.02; 364/131; 395/500, 421.01, 325, 400, 425; 370/58.3; 326/37

[56] References Cited

U.S. PATENT DOCUMENTS

| | | | |
|---|---|---|---|
| 4,306,298 | 12/1981 | McElroy | 395/421.01 |
| 4,484,323 | 11/1984 | Beuscher et al. | 370/58.3 |
| 5,402,014 | 3/1995 | Ziklik et al. | 326/37 |
| 5,504,669 | 4/1996 | Wakabayashi et al. | 364/131 |
| 5,537,353 | 7/1996 | Rao et al. | 365/189.02 |

Primary Examiner—Kevin J. Teska
Assistant Examiner—Dan Fiul
Attorney, Agent, or Firm—Lowe, Price, LeBlanc & Becker

[57] ABSTRACT

A microcomputer or a one-chip computer has address pins and data pins provided separately, and when a specified control signal is provided, the address pins act as multiplex pins for address and data signals. Further, a combination of bits for address signals and bits for data signals to be provided to the multiplex pins are changed according to a width of an external bus. For example, the data bits $D_i$ are combined with the address bits $A_i$, as used previously. Further, the data bits $D_{i-1}$ are combined with the address bits $A_i$ by shifting by one bit with respect to the address bits. One of the two types of the combination can be selected. If the microcomputer has 16-bit address pins, it can be connected to 8-bit memories having independent address and data pins, while it can also be connected to 8-bit peripherals having multiplex pins without using an external circuit for separating address and data signals.

7 Claims, 6 Drawing Sheets

1

MICROCOMPUTER HAVING MULTIPLEXABLE INPUT-OUTPUT PORT

BACKGROUND OF THE INVENTION

1. Field of the Invention

The present invention relates to a microprocessor and a one-chip microcomputer, especially to an input-output port thereof.

2. Description of the Prior Art

A microcomputer can be connected to external memories such as a read only memory and a random access memory. A one-chip microcomputer has a memory expansion mode where an external memory is used such as a static random access memory or an electrically erasable read only memory. It has an input-output port including pins for address signals and for data signals to be connected to an external address bus and to an external data bus, so that address signals and data signals are transmitted through the external buses. A memory has pins for address signals and pins for data signals separately. Then, the pins for address signals and for data signals of the microprocessor or the microcomputer are connected through the external address bus and the external data bus to the counterparts of the memory, respectively. However, the number of pins assigned for address and data signals of a one-chip microcomputer is large, and this limits the number of input-output ports which can be included in the one-chip microcomputer.

It is desirable that a one-chip computer has input-output ports as many as possible. Then, in order to reduce the number of address and data pins, multiplex pins are provided to transmit address and data signals in time division and they are connected to a multiplex bus. Then, the number of the pins needed for address and data signals is reduced, while the number of input-output ports can be increased. On the other hand, a memory has pins for address signals and for data signals separately. Therefore, an external circuit is needed to be connected between the multiplex bus and the memory in order to separate address and data signals, and this increases a cost of the system. This is a disadvantage of such multiplex bus.

A peripheral device such as a gate array or an application specific standard product (ASSP) often adopts multiplex pins for address and data signals in order to increase the number of input-output ports. In such a case, an external circuit is needed to connect address and data buses from a microcomputer to the multiplex bus, and this increases a cost of a computer system.

SUMMARY OF THE INVENTION

An object of the present invention is to provide a microcomputer or a one-chip microcomputer which can be connected to external devices with and without multiplex pins for address and data signals, not by using an external circuit for separating address and data signals.

A microcomputer of the invention comprises a central processing unit, an internal bus for address, data and control signals and an input-output port connected to said central processing unit through said internal bus. The input-output port including a first input-output circuit for address and data signals and a second input-output circuit for data signals to be connected to a first external bus and to a second external bus, respectively. The first input-output circuit can operate as multiplex input-output circuits if a specified control signal is received from a controller for providing control signals. The controller generates the control signals, for example, according to a signal for designating multiplexing or non-multiplexing, a timing signal used for multiplexing, a read/write signal and a signal for designating a bit width of the first external bus. For example, address or data signals ($A_i/D_{i-1}$ ($i=1$–$8$)), where $A_i$ denotes an i-th bit address signal and $D_{i-1}$ denotes an $(i-1)$-th bit data signal, are output in time division when the bit width of the first external bus is the same as the bit number of the data processed by said circuit portions.

An advantage of the present invention is that because a microcomputer has multiplexable pins, it can be connected to various kinds of peripheral devices for various external bus width, for example, without using an external circuit for separating address and data signals.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
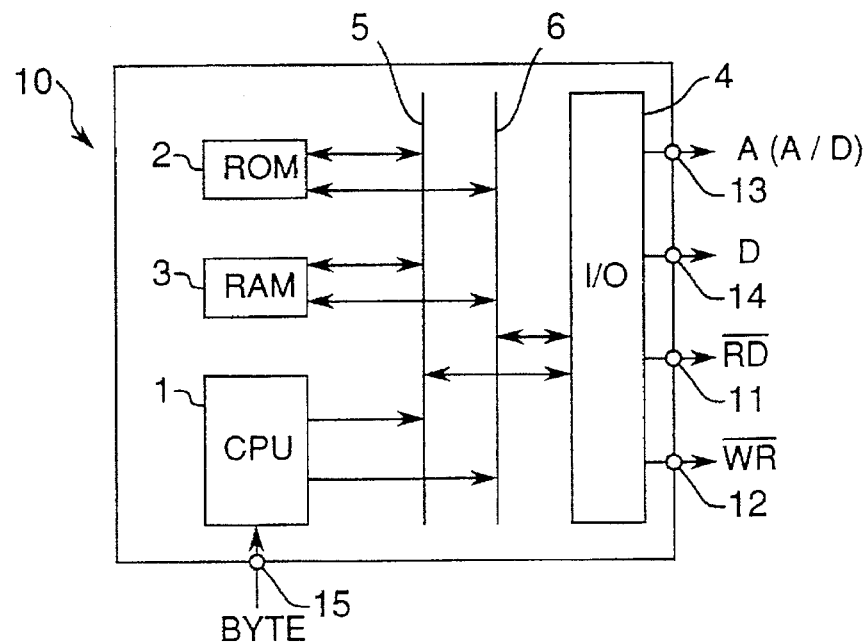
FIG. 1 is a diagram of a microcomputer.

Referring now to the drawings, wherein like reference characters designate like or corresponding parts throughout the several views, a microcomputer 10 of an embodiment of the invention is explained first. FIG. 1 shows an example of an internal structure of a microcomputer 10 wherein a central processing unit (CPU) 1, a read only memory (ROM) 2, a random access memory (RAM) 3 and an input-output port 4 are connected to an internal bus. In FIG. 1, an internal data bus 5 and an internal address bus 6 for data and address signals are shown. Though control signals are also supplied through an internal bus, a bus therefor is not shown explicitly for brevity. The input-output port 4 includes $\overline{RD}$ pin 11, $\overline{WR}$ pin 12, first pins 13, second pins 14 and BYTE pin 15. The pins 11 and 12 provide read control signal $\overline{RD}$ and write control signal $\overline{WR}$. The first pins 13 (expressed as A (A/D) in the drawing) are multiplexable pins which can operate as time division multiplex pins for address and data signals (A/D) under a specified condition or as address pins (A) otherwise, while the second pins 14 operate as data pins. It is a feature for the microcomputer that the multiplexable pins 13 are provided for address and data pins. A BYTE signal is provided to set a bit number of a bus to be connected to the pins 13. In this example, the BYTE signal is provided from the BYTE pin 15, but it is also possible to set the BYTE signal by the CPU 1. When an 8-bit bus is connected to the pins 13, the BYTE signal is set at "H" level, while when a 16-bit bus are connected to the pins 13, the BYTE signal is set at "L" level.

Figure 2:
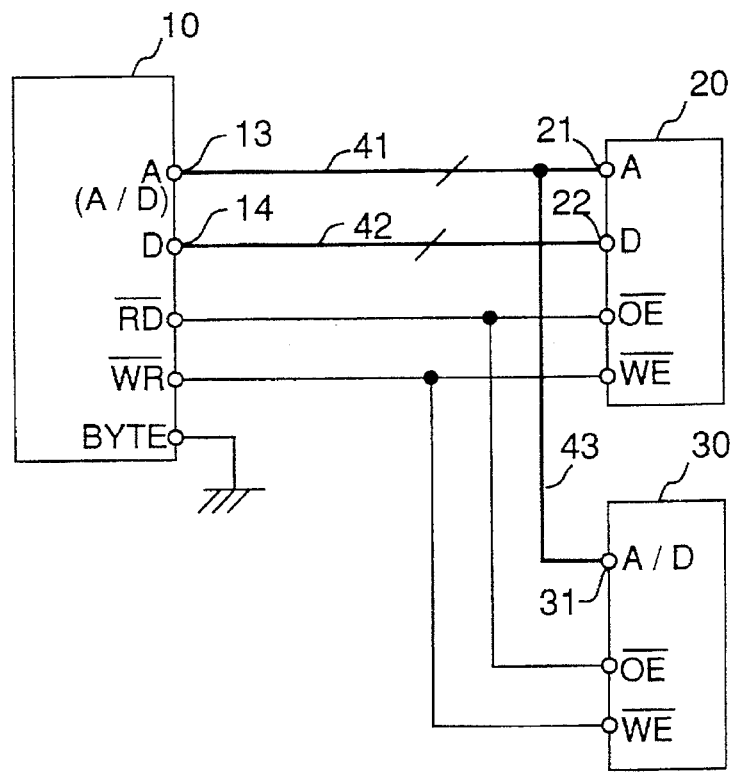
FIG. 2 is a diagram of a system of a microcomputer with peripheral components.

FIG. 2 shows a computer system comprising a microcomputer 10, an external memory 20 and an application specific standard product (ASSP) 30. As explained above, the microcomputer 10 has the sixteen first or multiplexable pins 13 and the sixteen second pins 14. The memory 20 has eight address pins 21 for address signals and eight data pins 22 for data signals, while the ASSP 30 has eight multiplex pins 31 for address and data signals. A first bus 41 connects the first pins 13 of the microcomputer 10 to the address pins of the memory 20, while a second bus 42 connects the second pins 14 to the data pins 22. Further, the first bus 41 is also connected to the multiplex pins 31 of the ASSP 30 through a third bus 43. The read and write control signals $\overline{RD}$ and $\overline{WR}$ are connected to output enable pin $\overline{OE}$ and write enable pin $\overline{WE}$. (If the memory 20 or the ASSP is a read only device, the $\overline{WR}$ signal is not needed to be supplied.) The microcomputer 10 has a mode for outputting only address signals to the bus 41 and a multiplex mode for transmitting address signals and data ones through the bus 41 alternately, as will be explained below. The BYTE signal is set at the ground level in FIG. 2, and this means that the bit width of the bus 41 is sixteen. Therefore, the microcomputer can be connected to a memory having address pins and data pins provided separately, while it can also be connected to a peripheral having multiples pins without using an external circuit for separating address and data signals.

It is another feature of the microcomputer 10 that when the first pins 13 operate as multiplex pins, an order of address signals at the first pins 13 can be set so as to have a prescribed relation to the counterpart of the data signals according to bit width of the bus 41. The microcomputer 10 can be connected to memories or other peripherals storing an 8-bit data and to those storing an 16-bit data. In this embodiment, for example, if the number of the pins 13 are eight while the pins 31 are also eight, the same bits are arranged to correspond to each other. That is, address bits A0, A1, A2, . . . , A7 are arranged to correspond to data bits D0, D1, D2, . . . , D7. For example, the address bit A0 is assigned to the same multiplexable pin 13 as the data bit D0. This type of address bit-data bit correspondence of the address signals to the data signals at the multiplex pins is already adopted in prior art devices. On the other hand, if numbers of the pins 13 are sixteen while the pins 31 are eight, bit positions of the address signals and the data signals can be changed. For example, address bits A1, A2, A3, . . . , A8 are arranged to correspond to data bits D0, D1, D2, . . . , D7, or the bit positions are shifted by one bit. In this case, the address bit A1 is assigned to the same multiplexable pin 13 as the data bit D0. By using such a new type of bit arrangement, memories for 8-bit data can be used as 16-bit data. An example of a microcomputer system shown in FIG. 8 which will be explained later uses this advantage of the embodiment. In this embodiment, the bit positions are shifted by one bit, but any correspondence between the data signals and address signals can be adopted.

Figure 3:
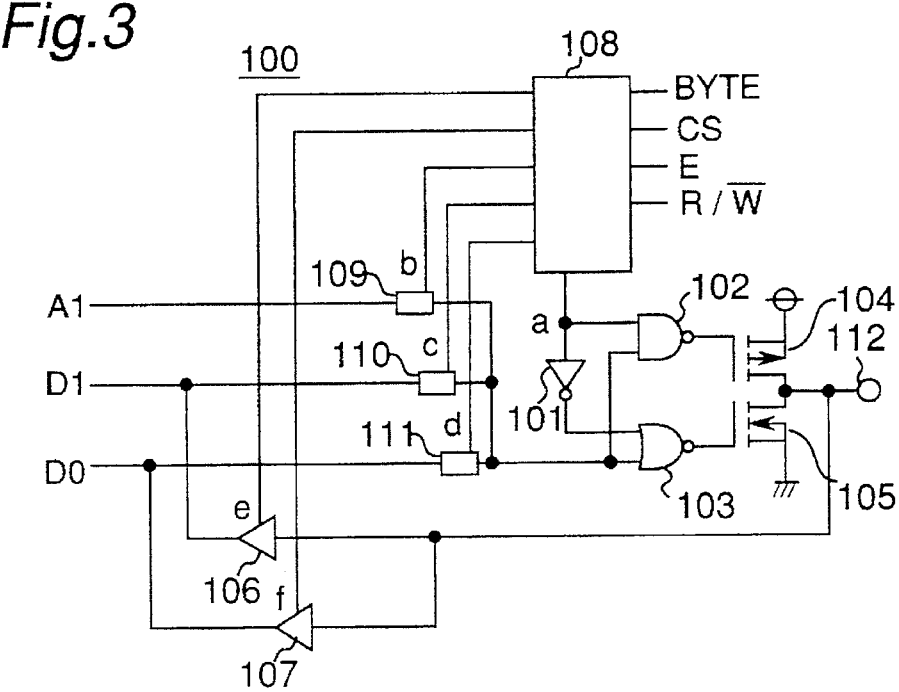
FIG. 3 is a circuit diagram of a part of an input-output port for multiplexable pins shown in FIG. 1.

FIG. 3 shows an example of a part of the input-output circuit 100 of the input-output port 4 including the first or multiplexable pins 13 where the bit arrangement can be changed according to the bit width of the bus 41. As mentioned above, the pins 13 can operate as multiplex pins for address and data signals (A/D) under specified conditions. FIG. 3 shows only a portion for one of the pins 13 related to address bits A0 and A1 and data bit D0, for the easiness of illustration, and the input-output circuit 100 includes such a portion for each of the sixteen pins 13 besides the common controller 108.

The portion shown in FIG. 3 of the input-output circuit 100 is connected to an internal address line A1 in the internal address bus 5 and internal data lines D0 and D1 in the internal data bus 6 while it is also connected to the external bus 29 through a pin 112 of the multiplexable pins 13. A control signal generator 108 (FIGS. 4A–4D) generates control signals "a"–"f" for the circuit according to control signals, that is, internal timing signal E, chip select signal CS and read/write signal R/$\overline{W}$ generated by the microcomputer 10, and the BYTE signal supplied from the external. The CS signal is used to select non-multiplexing or multiplexing. The BYTE signal is used to set the bit number, 8 or 16, of the bus 41 to be connected. The timing signal E is used for multiplexing between address and data signals to be output alternately. The read/write signal R/$\overline{W}$ means a read cycle at H level and a write cycle at L level. A first transmission gate 109 transmits a signal from the internal address bus line A1 when a control signal "b" is received, while second and third transmission gates 110 and 111 transmit signals from the internal data bus line D0 and D1, respectively, when control signals "c" and "d" are received. Only one of the control signals "b", "c" and "d" is provided at a time, and an output signal from one of the transmission gates 109–111 is supplied to one of the two inputs of a NAND gate 102 and a NOR gate 103, while a control signal "a" is supplied to the other of the inputs of the NAND gate 102 without inversion and to the other of the inputs of the NOR gate 103 via an inverter 101. Outputs of the NAND and NOR gates 102 and 103 are connected to gates of a P channel MOS transistor 104 and an N channel MOS transistor 105. The transistors 104 and 105 are connected to each other in series and a connection point between them is connected to the pin 112. The transistors 104 and 105 are also connected between $V_{cc}$ and the ground. Thus, the transistors 104 and 105 transmit a signal from the internal line A1, D0 or D1 to the pin 112 when the control signal "a" is supplied. On the other hand, the pin 112 is connected to tri-state buffers 106 and 107 which transmit a signal from the pin 112 to the internal data bus line D0 or D1 when control signal "e" and "f" are received.

Figure 4A:
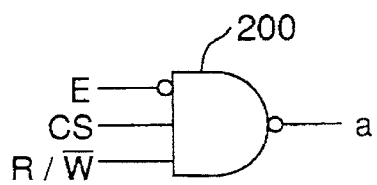
FIGS. 4A, 4B, 4C and 4D are circuit diagrams of a control signal generator shown in FIG. 3.
Figure 4B:
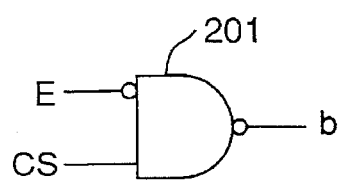
Figure 4C:
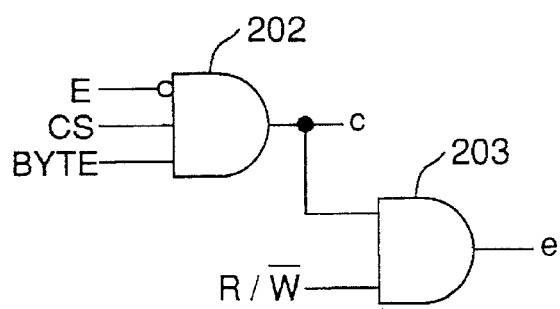
Figure 4D:
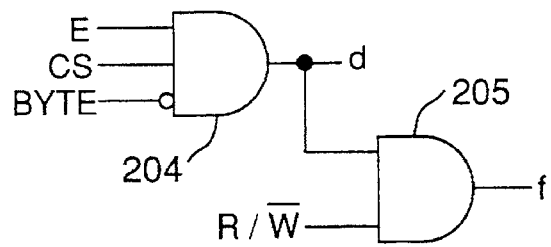

FIGS. 4A–4D shows parts of the controller 108 for generating bus control signals "a"–"f". As shown in FIG. 4A, an inverted signal of the internal timing signal E, the chip select signal CS and the read/write signal R/$\overline{W}$ are input to a NAND gate 200 to supply the control signal "a". As shown in FIG. 4B, an inverted signal of the internal timing signal E and the chip select signal CS are input to a NAND gate 201 to supply the control signal "b". As shown in FIG. 4C, an inverted signal of the internal timing signal E, the chip select signal CS and the BYTE signal are input to an AND gate 202 to supply the control signal "c". The signal "c" and the read/write signal R/$\overline{W}$ are input to another AND gate 203 to supply the control signal "e". As shown in FIG. 4D, the internal timing signal E, the chip select signal CS and an inverted signal of the BYTE signal are input to an AND gate 204 to supply the control signal "d". The signal "d" and the read/write signal R/$\overline{W}$ are input to another AND gate 205 to supply the control signal "f". Table 1 shows the bus control signals "a"–"f" under various conditions to be set by the microcomputer 10.

TABLE 1

Conditions for generating bus control signals "a"–"f"

| Setting conditions | Control signals | | | | | |
|---|---|---|---|---|---|---|
| | a | b | c | d | e | f |
| A  E = H | H | H | L | L | L | L |
| B  E = L, CS = L | H | H | L | L | L | L |
| C  E = L, CS = H<br>R = H, BYTE = H | L | L | H | L | H | L |
| D  E = L, CS = H<br>$\overline{W}$ = L, BYTE = H | H | L | H | L | L | L |
| E  E = L, CS = H<br>R = H, BYTE = L | L | L | L | H | L | H |
| F  E = L, CS = H<br>$\overline{W}$ = L, BYTE = L | H | L | L | H | L | L |

Figure 5:
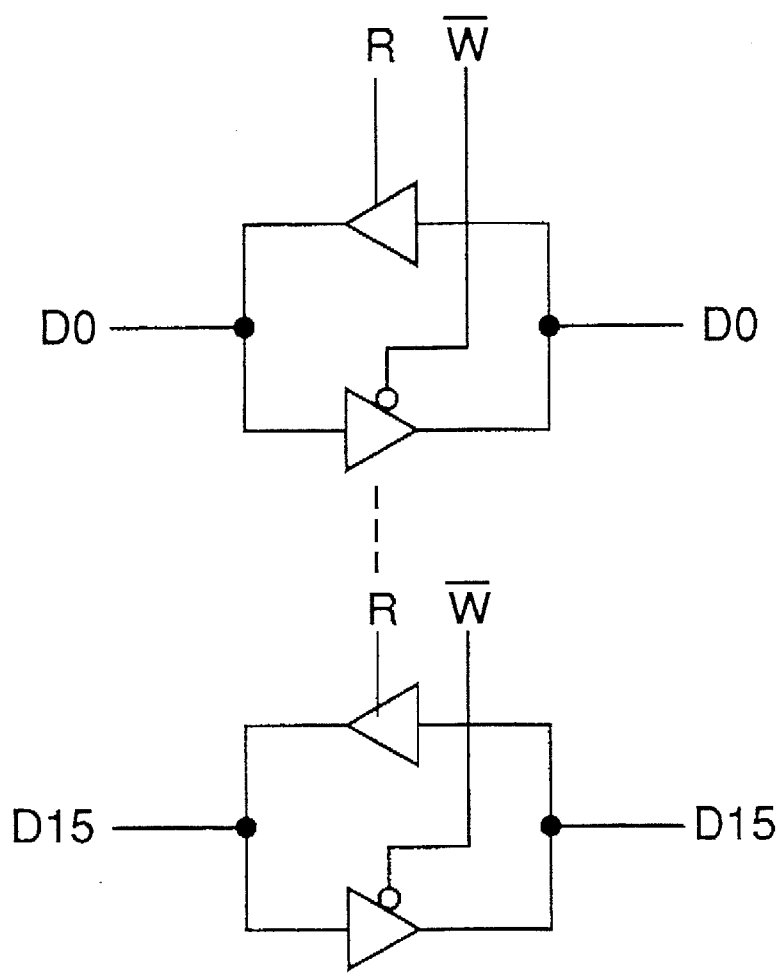
FIG. 5 is a circuit diagram of a part of the input-output port for data signals.

FIG. 5 shows an example of input-output circuits for each data bit to be provided in the input-output port 4 for the pins 14 for address signals. This is a conventional input-output circuits including bi-directional buffers for sixteen address bits D0–D15 controlled by the read/write signal R/$\overline{W}$.

Figure 6A:
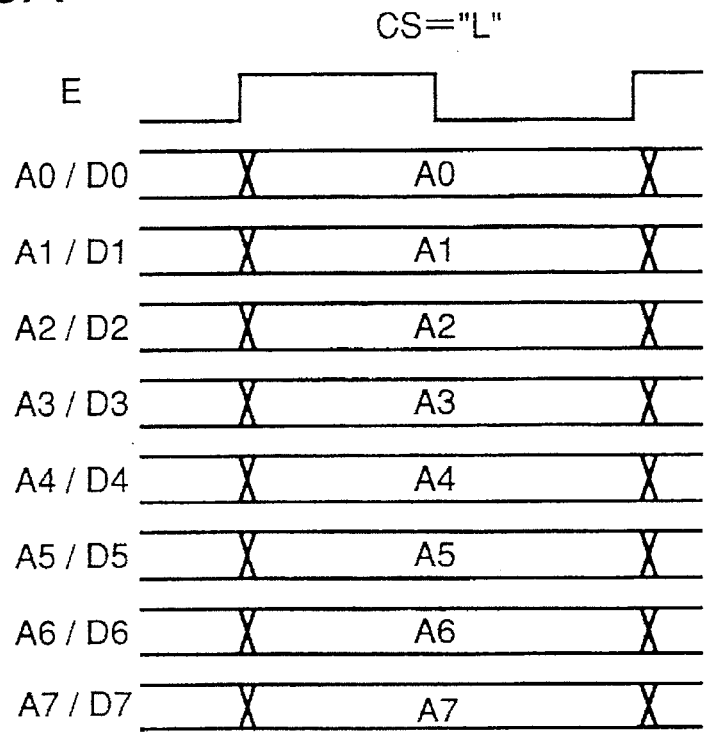
FIGS. 6A and 6B are timing charts of address and data signals for bit width of eight bits.

Next, it is explained how the input-output port 4 operates for the memory 20 without multiplex pins and for the ASSP 30 with multiplex address-data pins (A/D) when an 8-bit bus or a 16-bit bus is connected to the pins 13. Thus, there are four cases. In a first case, the BYTE signal is set as "H" level or the pins 13 are connected to an 8-bit bus, and the chip select signal CS is set at "L" level or the memory 11 is accessed. A timing chart of this case is shown in FIG. 6A. In this case, the address bits A0–A7 corresponds to the data bits D0–D7, and shown at the left side in FIG. 6A.

The input-output circuit 4 outputs a 1-bit address signal A1 from the internal address bus 5 to the pin 112. That is, the control signal generator 108 provides the control signals "a" and "b" of "H" level and "c"–"f" of "L" level. Because the signal "b" is set at "H" level and "c" and "d" are set at "L" level, the transmission gate 109 is opened, while the other transmission gates 110 and 111 are closed. Because the control signal "a" is set at "H" level, the output circuit made of components 101–105 is turned on and the signal A1 is output to the pin 112. Further, because the control signals "e" and "f" are set at "L" level, the buffers 106 and 107 are not activated or the pin 112 is not connected to the internal bus lines D1 and D2. In general, address data A0–A7 are output through the bus 41 to the memory 20.

Figure 6B:
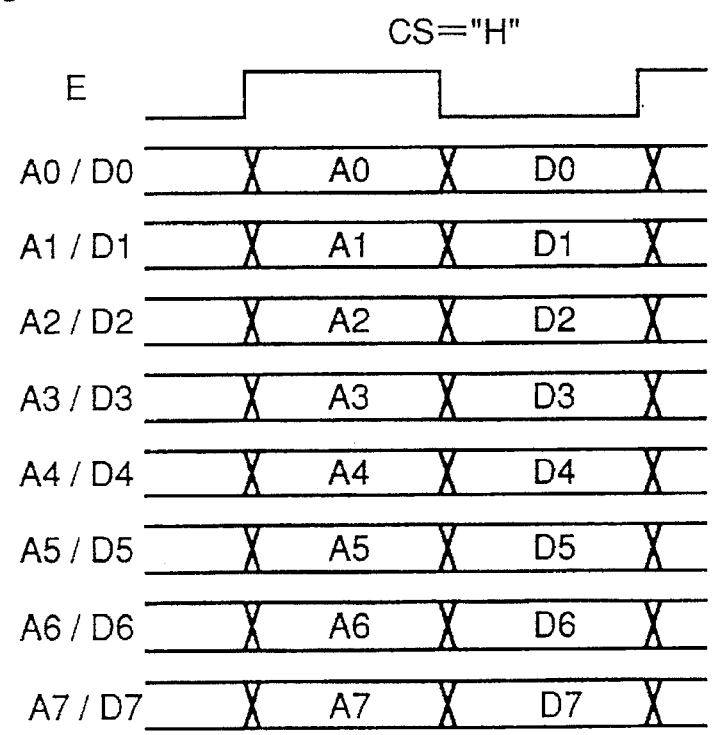

In a second case, the BYTE signal is set as "H" level or the pins 13 are connected to an 8-bit bus, and the chip select signal CS is set at "H" level or the ASSP 30 with multiplex pins is accessed. FIG. 6B shows a timing chart of this case. In this case, the address bits A0–A7 corresponds also to the data bits D0–D7, as shown at the left side in FIG. 6B, or A0/D0–A7/D7 denote signals at each of eight multiplexable pins 13. The input-output circuit 4 operates differently according as the timing signal E is set at "H" level or at "L" level for multiplexing, as shown in FIG. 6B.

When the timing signal is set at "H" level, the address signal A1 is sent to the pin 112. That is, the control signal generator 108 provides the control signals "a" and "b" of "H" level and those "c"–"f" of "L" level, similarly to the above-mentioned case. Because the signal "b" is set at "H" level and those "c" and "d" are set at "L" level, the transmission gate 109 is opened, while those 110 and 111 are closed. Because the control signal "a" is set at "H" level, the output circuit made of components 101–105 is turned on and the signal A1 is output to the pin 112. Further, because the control signals "e" and "f" are set at "L" level, the buffers 106 and 107 are not activated or the pin 112 is not connected to the internal bus lines D1 and D2. In general, address bits A0–A7 are output through the bus 41 to the ASSP 30.

On the other hand, when the timing signal E is set at "L" level, there are two situations where the internal read/write signal R/$\overline{W}$ is set at "H" or "L" level. When the internal read signal R is set at "H" level or the CPU 1 reads data from the ASSP 30, a data signal at the pin 112 is sent to the first line D1 of the internal data bus. That is, the control signal generator 108 provides the control signals "c" and "f" of "H" level and those "a", "b", "d" and "e" of "L" level. Because the signal "c" is set at "H" level and those "b" and "d" are set at "L" level, the transmission gate 110 is opened, while those 109 and 111 are closed. Because the signal "a" is set at "L" level, the output circuit made of the components 101–105 is turned off. On the other hand, because the signal "e" is set at "H" level and the signal "f" are set at "L" level, the buffer 106 is turned on while the other buffer 107 is not activated. Therefore, the pin 112 is connected to the internal bus line D1. In general, data bits D0–D7 are received from the ASSP 30.

Further, when the internal write signal $\overline{W}$ is set at "L" level or the CPU 1 writes data to the ASSP 30, a data signal at the first bus line D1 is sent to the pin 112. That is, the control signal generator 108 provides the control signals "a" and "c" of "H" level and those "b", "d"–"f" of "L" level. Because the signal "c" is set at "H" level and those "b" and "d" are set at "L" level, the transmission gate 110 is opened, while those 109 and 111 are closed. Because the signal "a" is set at "H" level, the output circuit made of the components 101–105 is turned on to provide a data from the bus line D1 to the pin 112. On the other hand, because the signals "e" and "f" are set at "L" level, the buffers 106 and 107 are not activated. In general, data bits D0–D7 are sent to the ASSP 30.

Figure 7A:
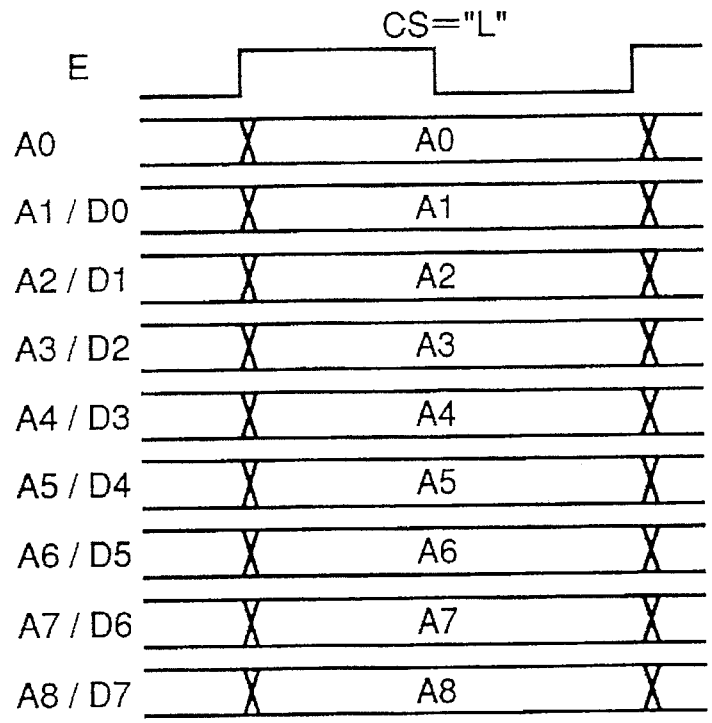
FIGS. 7A and 7B are timing charts of address and data signals for bit width of sixteen bits.

Next, the other cases are explained where the BYTE signal is set as "L" level or the pins 13 are connected to an 16-bit bus. In a third case, the chip select signal CS is set at "L" level or the memory 20 is accessed. FIG. 7A shows a timing chart of this case. The input-output circuit 4 outputs a 1-bit address signal A1 from the internal address bus 5 to the pin 112. That is, the control signal generator 108 provides the control signals "a" and "b" of "H" level and those "c"–"f" of "L" level. Because the signal "b" is set at "H" level and those "c" and "d" are set at "L" level, the transmission gate 109 is opened, while those 110 and 111 are closed. Because the control signal "a" is set at "H" level, the output circuit made of components 101–105 is turned on and the signal A1 is output to the pin 112. Further, because the control signals "e" and "f" are set at "L" level, the buffers 106 and 107 are not activated or the pin 112 is not connected to the internal bus lines D1 and D2. In general, address bits A0–A16 are sent to the memory 20.

Figure 7B:
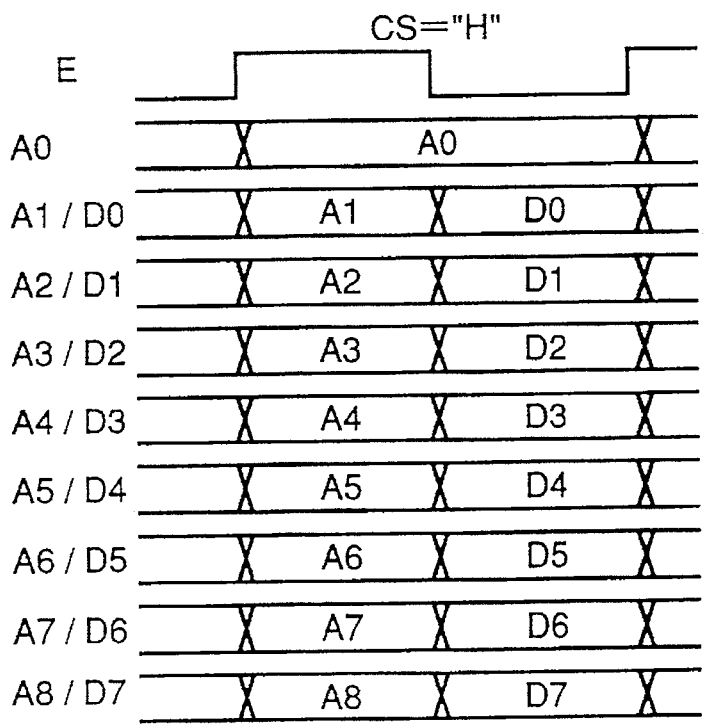

In a fourth case, the BYTE signal is set as "L" level or the pins 13 are connected to an 16-bit bus and the chip select signal CS is set at "H" level or the ASSP 30 with multiplex pins is accessed. FIG. 7B shows a timing chart of this case. In this case, the address bits A1–A8 corresponds also to the data bits D0–D7, as shown at the left side in FIG. 7B. The input-output circuit 4 operates differently for multiplexing according as the timing signal E is set at "H" level or at "L" level. When the timing signal E is set at "H" level, the address signal A1 is sent to the pin 112. That is, the control signal generator 108 provides the control signals "a" and "b" of "H" level and those "c"–"f" of "L" level. Because the signal "b" is set at "H" level and those "c" and "d" are set at "L" level, the transmission gate 109 is opened, while those 110 and 111 are closed. Because the control signal "a" is set at "H" level, the output circuit made of components 101–105 is turned on and the signal A1 is output to the pin 112. Further, because the control signals "e" and "f" are set at "L" level, the buffers 106 and 107 are not activated or the pin 112 is not connected to the internal bus lines D1 and D2. In general, address bits A0–A16 are sent to the ASSP 30.

On the contrary, when the timing signal E is set at "L" level, there are two cases where the internal read/write signal R/$\overline{W}$ is set at "H" or "L" level. When the internal read signal R is set at "H" level or the CPU 55 reads data from the ASSP 12, a data signal at the pin 112 is sent to the 0-th line D0 of the internal data bus. That is, the control signal generator 108 provides the control signals "d" and "f" of "H" level and those "a"–"c" and "e" of "L" level. Because the signal "d" is set at "H" level and those "b" and "c" are set at "L" level, the transmission gate 111 is opened, while those 109 and 110 are closed. Because the signal "a" is set at "L" level, the output circuit made of the components 101–105 is turned off. On the other hand, because the signal "f" is set at "H" level and the signal "e" are set at "L" level, the buffer 107 is turned on while the other buffer 106 is not activated. Therefore, the pin 112 is connected to the internal bus line D0. In general, data bits D0–D7 are read, but the bit correspondence is different as will be understood by comparing FIGS. 6B and 7B.

When the internal write signal $\overline{W}$ is set at "L" level or the CPU 55 writes data to the ASSP 12, a data signal at the zeroth bus line D0 is sent to the pin 112. That is, the control signal generator 108 provides the control signals "a" and "d" of "H" level and those "b", "c", "d" and "f" of "L" level. Because the signal "d" is set at "H" level and those "b" and "c" are set at "L" level, the transmission gate 111 is opened, while those 109 and 110 are closed. Because the signal "a" is set at "H" level, the output circuit made of the components 101–105 is turned on to provide a data from the bus line D0 to the pin 112. On the other hand, because the signals "e" and "f" are set at "L" level, the buffers 106 and 107 are not activated. Thus, in general, data bits D0–D7 are written.

When data signals are output to the bus in the fourth case, data signals are output differently for 16-bit bus, as shown in FIG. 7B, the CPU 1 has to convert the data signals so as to be received by the ASSP 30 normally. Table 1 shows conversion of by the microcomputer 10 to read data signals of "0"–"5" from or write them to the ASSP 30. For example, "000000010" is output for data "1" by the CPU 1. That is, the data signal is shifted by one bit, while the zeroth bit is used for "A0" or 0 in Table 2. This data conversion is can be dealt easily by the CPU 1.

TABLE 2

Data for bit arrangement for a combination of address and data bits

| | CPU | ASSP |
|---|---|---|
| 0 | 000000000 | 00000000 |
| 1 | 000000010 | 00000001 |
| 2 | 000000100 | 00000010 |
| 3 | 000000110 | 00000011 |
| 4 | 000001000 | 00000100 |
| 5 | 000001010 | 00000101 |

Figure 8:
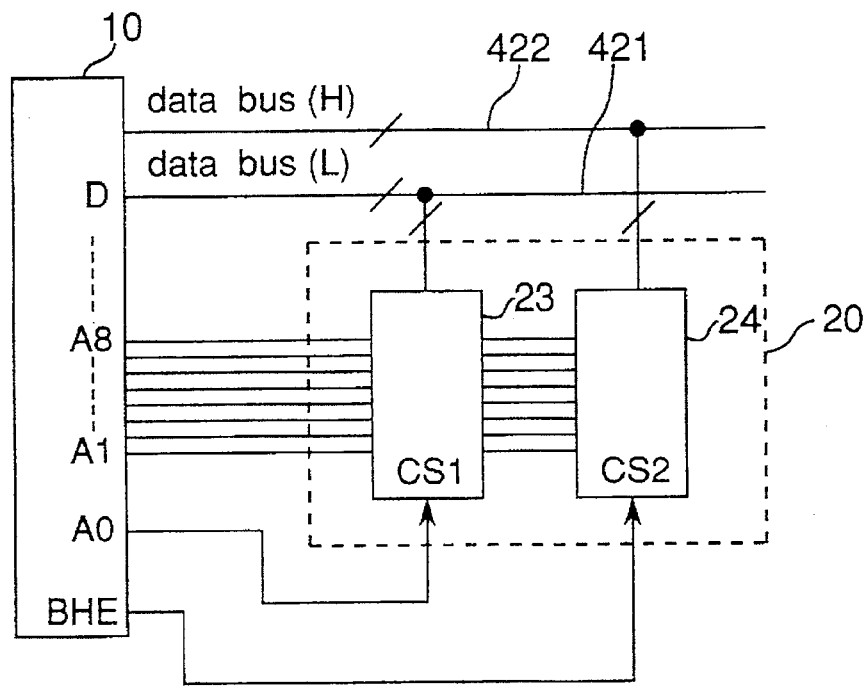
FIG. 8 is a diagram of connection of a microcomputer with external memory components.

FIG. 8 shows a system where the microcomputer 10 having 16-bit multiplexable pins 13 and 16-bit data pins 14 is connected to a memory system 20 including two memory devices 23 and 24 each having 8-bit address pins 21 and 8-bit data pins 22. Though the memory devices 23 and 24 store 8-bit data, they are combined to store 16-bit data by storing lower eight bits and upper eight bits respectively. The pins 13 act as multiplex pins (A0–A15) in this case. The microcomputer 10 can supply a bus high enable (BHE) signal for outputting a higher 8-bit data at pins for D15–D8 signals. (A microcomputer for 16-bit data usually provides a signal similar to the BHE signal.) Then, the BYTE signal and address bit A0 are used for chip select. That is, address pin A0 is connected to chip select input CS1 of the memory device 23, and the BHE signal is supplied to chip select input CS2 of the other memory device 24. Address bits A1–A8 are connected to address pins of the two memory devices 23 and 24 commonly, while a lower 8-bit data bus 421 and an upper 8-bit one 422 of the data bus are connected between the D7–D0 and D15–D8 data pins and the memory devices 23 and 24. The memory device 23 for lower eight bits is activated when the address signal A0 is set at H level to receive an 8-bit address from the pins A1–A8 of the microcomputer 20 at the pins A0–A7 thereof and a lower 8-bit data through the data bus 421 to the data pins thereof. Further, the other memory device 24 for higher eight bits is activated when the BHE signal is set at H level to receive an 8-bit address from the pins A1–A8 of the microcomputer 20 at the pins A0–A7 thereof and a higher 8-bit data through the data bus 422 to the data pins thereof. Thus, a 16-bit data can be accessed at the address designated by bits A8–A1.

In the present embodiment, the memory 20 and the ASSP 30 deals 8-bit data, while the microcomputer 10 can change output timings of address signals A and data ones D for time division at the pins 31 according as the digit number of the bus 41, 42 is eight or sixteen.

Figure 9:
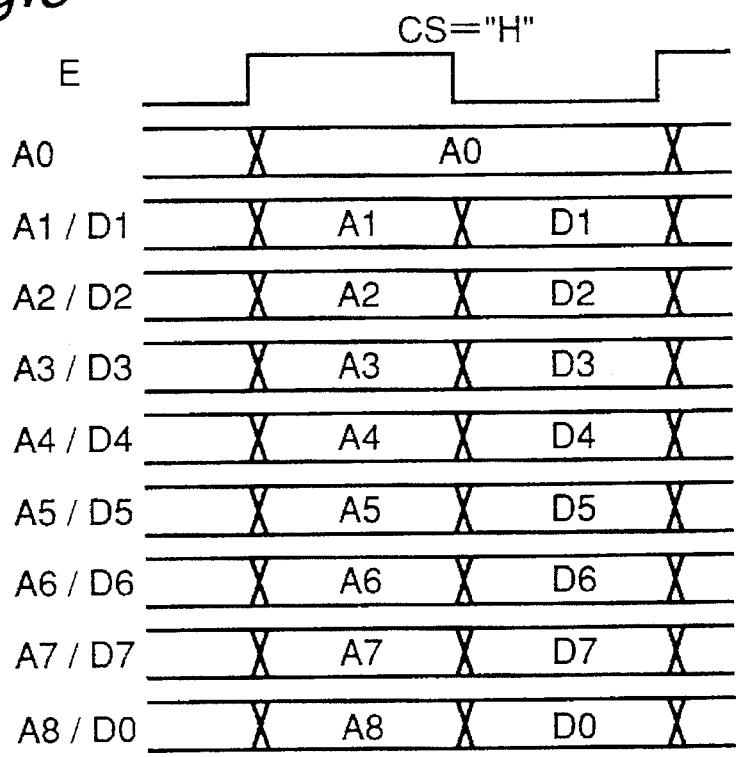
FIG. 9 is a timing chart of address and data signals for illustrating a modified example.

A combination of address bits and data bits in the input-output port 4 can be changed in various ways. FIG. 9 shows a timing chart for a different combination, where address bits A1–A7 are combined with data bits D1–D7. On the other hand, address bit A0 is not combined with any data bit, similarly to the case shown in FIG. 6B, and address bit A8 is combined with data bit D0. Table 3 shows data for "0"–"5" supplied by the CPU 1.

TABLE 3

Data for a bit arrangement for another combination of address and data bits

| | CPU | ASSP |
|---|---|---|
| 0 | 000000000 | 00000000 |
| 1 | 100000000 | 00000001 |
| 2 | 000000010 | 00000010 |
| 3 | 100000010 | 00000011 |
| 4 | 000000100 | 00000100 |
| 5 | 100000100 | 00000101 |

The microcomputer 10 for a 16-bit bus can be connected to peripherals for 16-bit data and for 8-bit data. Further, It is also possible that if a microcomputer for a 32-bit bus is used, peripherals for 32-, 16- or 8-bit data can be connected thereto.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A microcomputer comprising:

a central processing unit;

an internal bus for address, data and control signals connected to said central processing unit;

an input-output port connected to said central processing unit through said internal bus, said input-output port including a first input-output circuit for address and data signals and a second input-output circuit for data signals to be connected to a first external bus and to a second external bus, respectively, said first input-output circuit comprising a controller for providing control signals, and circuit portions for outputting address or data signals when specified signals are received from said controller, wherein an order of the address signals in relation to the counterpart of the data signals to be output by said circuit portions can be changed by said controller.

2. The microcomputer according to claim 1, wherein said controller generates the control signals according to a signal for designating multiplexing or non-multiplexing, a timing signal used for multiplexing, a read/$\overline{\text{write}}$ signal and a signal for designating a bit width of the first external bus.

3. The microcomputer according to claim 2, wherein said central processing unit has a pin for setting a signal for designating a bit width of the first external bus.

4. The microcomputer according to claim 1, the circuit portions outputing address or data signals as $A_i/D_{i-1}$ (i=1–8) where $A_i$ denotes an i-th bit address signal and $D_{i-1}$ denotes an (i−1)-th bit data signal when the bit width of the first external bus is the same as the bit number of the data processed by said circuit portions.

5. The microcomputer according to claim 4, wherein said circuit portions can process a 16-bit data while the first external bus to be connected to said circuit portions is an 16-bit bus.

6. The microcomputer according to claim 4, wherein zeroth address signal A0 and a byte high enable signal are used as chip select signals.

7. The microcomputer according to claim 1, wherein said circuit portions can process a 16-bit data while the first external bus to be connected to said circuit portions is an 8-bit bus.

* * * * *

UNITED STATES PATENT AND TRADEMARK OFFICE
CERTIFICATE OF CORRECTION

PATENT NO. : 5,652,870
DATED : July 29, 1997
INVENTOR(S) : Takashi YAMASAKI et al.

It is certified that error appears in the above-identified patent and that said Letters Patent is hereby corrected as shown below:

On the title page, insert the following information:
[30] Foreign Application Priority Data
 Nov. 11, 1994    [JP]    Japan   . . . . 6-277671

Signed and Sealed this

Twenty-fifth Day of November, 1997

Attest:

BRUCE LEHMAN

*Attesting Officer*   Commissioner of Patents and Trademarks